United States Patent [19]
Williams et al.

[11] Patent Number: 5,217,246
[45] Date of Patent: Jun. 8, 1993

[54] CONTROL SYSTEM FOR CONTROLLING THE SUSPENSION OF A LAND VEHICLE

[75] Inventors: David A. Williams, Milton Keynes; Peter G. Wright; John P. Davis, both of Wymondham, all of United Kingdom

[73] Assignee: Group Lotus PLC, Nofolk, United Kingdom

[21] Appl. No.: 773,877

[22] PCT Filed: Apr. 24, 1990

[86] PCT No.: PCT/GB90/00628
§ 371 Date: Dec. 13, 1991
§ 102(e) Date: Dec. 13, 1991

[87] PCT Pub. No.: WO90/12700
PCT Pub. Date: Nov. 1, 1990

[30] Foreign Application Priority Data
Apr. 24, 1989 [GB] United Kingdom ............... 8909299

[51] Int. Cl.⁵ ............................................. B60G 17/01
[52] U.S. Cl. .................................... 280/707; 280/840; 280/772; 280/DIG. 1; 180/41; 364/424.05

[58] Field of Search ......... 280/707, 840, 772, DIG. 1; 364/424.05; 180/41

[56] References Cited
FOREIGN PATENT DOCUMENTS
0114757 8/1984 European Pat. Off. .
89/00512 1/1989 World Int. Prop. O. .

Primary Examiner—Kenneth R. Rice
Attorney, Agent, or Firm—Kinney & Lange

[57] ABSTRACT

The invention relates to an active suspension system for controlling the suspension of a wheeled land vehicle, which comprises an actuator (31) of variable length in parallel with a spring (34), connected between the body or chassis of a vehicle and a wheel and hub assembly (40) of such. The extension/contraction of the actuator is controlled by a control unit (60) in response to parameters measured by various sensors (61, 64, 65, 66 and 62). The control unit (60) also makes allowance for loads on the vehicle not measured by the sensors, so that accurate control of the suspension system is achieved.

9 Claims, 2 Drawing Sheets

CONTROL SYSTEM FOR CONTROLLING THE SUSPENSION OF A LAND VEHICLE

This invention relates to a control system for controlling the suspension system of a land vehicle, in particular a motor vehicle. By "land vehicle" is meant all classes of vehicle capable of powered motion over the land, including motor cars, motor cycles, tractors and tracked vehicles.

In particular, the invention relates to a control system for controlling a motor vehicle having an active suspension system.

An active suspension system is a motor vehicle suspension system in which the conventional suspension components, such as springs and dampers, are assisted or replaced by actuators operable in response to command signals from a microprocessor in order to correct, change or control the attitude of the vehicle. The aim of such a system is to minimise variations in the forces experienced by the vehicle body, thereby improving vehicle safety and enhancing driver and passenger comfort.

The command signals are produced as a result of the measured values of a number of variables defining the motor vehicle's attitude. In a truly active suspension system, there is the capability not merely of operating the actuators in response to previously measured changes in the values of the variables, but also of, for example, biassing the attitude of the vehicle in some way to offset the effects of a steady-state or dynamic loading; and even of operating the actuators in a manner predictive of expected road conditions.

Active suspension systems are now well known. For example, European Patent Application number EP-A-0114757 discloses an active suspension system for a four-wheeled motor vehicle in which force measurements are taken at the points of support of the vehicle body on each wheel/hub assembly and processed to produce a demanded output of the actuator secured to operate between each wheel/hub assembly and the body of the vehicle.

A control system for controlling the attitude of a motor vehicle having an active suspension system is known to include means for converting the forces measured at the points of support of the vehicle body or the wheel/hub assemblies to a set of modal forces which act on the vehicle body as a whole relative to the wheel/hub assemblies. The required actuator outputs may then be calculated to overcome the combined modal forces in order to maintain the desired attitude of the vehicle. The modal forces are the heave, pitch, roll and warp forces.

A significant advantage of an active suspension system is that the suspension characteristics of a vehicle may be continuously altered to accommodate varying road conditions and operating conditions of the vehicle. This facility permits the constructions of a vehicle which has improved safety characteristics, since it is possible to maintain a greater degree of contact of the vehicle tyres with a road surface, and the vehicle is likely to be more predictable to the driver, than in the case of a vehicle not having an active suspension system.

However, a disadvantage of an active suspension system which resolves the forces measured at the points of support of the vehicle body on each wheel/hub assembly into modal forces is that the resulting modal force values do not accurately reflect the net forces experienced by the vehicle body as a result of road inputs. (By "road inputs" is meant the force effect of the vehicle passing over irregularities in a road surface, such irregularities being, for example, bumps and depressions.)

The active suspension systems currently available lack precision since they do not take into account all of the loads transmitted from the unsprung matters of the vehicle, the wheel and hub assemblies, to the sprung matter of the vehicle, the chassis or body of the vehicle. The suspension linkage arrangement commonly used by vehicles transmits load from the unsprung masses to the sprung mass by a plurality of load paths. To date, active suspension system have only considered those loads which can be measured, that is to say the loads on the actuator and spring assembly.

According to the invention, there is therefore provided a control system for controlling an active suspension system of a land vehicle, comprising:

means for measuring loads between the sprung mass of said vehicle and one or more unsprung masses connected thereto;

means for producing a plurality of signals which include the values of measured said loads;

means for modifying said signals to compensate for unmeasured loads between the sprung mass and the unsprung masses; and means for applying forces to control the attitude of said vehicle in dependence on said modified signals.

According to a second preferred aspect of the invention, there is provided a control system for controlling an active suspension system of a land vehicle, comprising:

means for measuring the vertical accelerations of one or more unsprung masses connected to said vehicle;

means for producing signals proportional to said measured accelerations;

means for modifying said signals selectively to increase or decrease the extent to which each such signal is dependent on the magnitude of its corresponding unsprung mass; and means for including said modified signals in the output signals of said active suspension system, means being provided to apply forces to said vehicle to control its attitude in dependence on said output signals.

There now follows a description of a specific embodiment of the invention, by way of example, with reference being made to the accompanying drawings in which.

Figure 1:
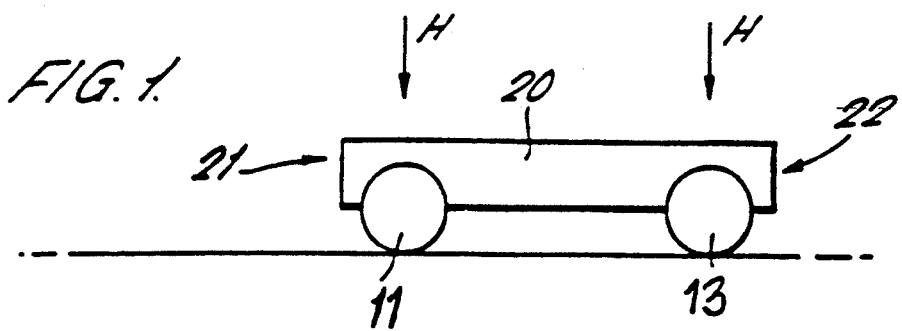
FIG. 1 is a schematic representation of the effects of heave forces on the body of a motor vehicle not having an active suspension system.

Referring to the drawings, FIGS. 1 to 4 show schematically a sprung mass in the form of a motor vehicle body 20 having four associated unsprung masses, i.e. four wheels 11, 12, 13, 14 and a respective interconnecting suspension system (not shown) for each wheel. The vehicle body includes the engine, transmission and all the ancillary components of the motor vehicle. The motor vehicles shown schematically in FIGS. 1 to 4 represent the behaviour of known vehicles not having a control system according to the invention.

FIGS. 1 to 4 are schematic representations of the typical displacements of a motor vehicle body 20 occasioned by heave, pitch, roll and warp forces respectively. In FIGS. 1 to 4, a numbering convention is adopted such that the front, left hand wheel of the vehicle is labelled 11, the front, right hand wheel is labelled 12 and so on to the rear, right hand wheel which is labelled 14; and the heave, pitch, roll and warp forces are respectively indicated by arrows H, P, R and W in their corresponding drawing figures. The modal forces shown in FIGS. 1 to 4 are drawn acting positively according to the sign convention adopted. The front of the vehicle is indicated generally by the reference numeral 21.

In FIG. 1 the modal force of heave is an equal downward force acting on all four suspension points of the vehicle body. The vehicle body 20 therefore tends to move uniformly downwardly without tilting in any direction under the influence of positive heave.

Figure 2:
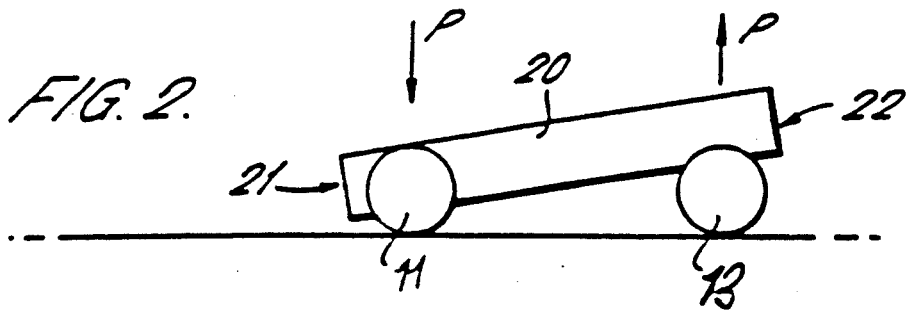
FIG. 2 is a schematic representation of the effects of pitch forces on the body of a motor vehicle not having an active suspension system.

Positive pitch modal forces are illustrated in FIG. 2 and it is clear that a positive pitch modal force applied to the vehicle body tends to result in downward displacement of the front end 21 of the body with no tilting from side to side, and with the rear 22 of the vehicle being displaced upwardly from its original position.

Figure 3:
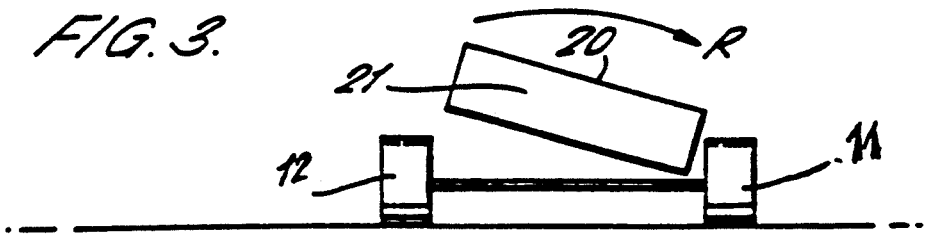
FIG. 3 is a schematic representation of the effects of roll forces on the body of a motor vehicle not having an active suspension system.

The modal force of roll is shown in FIG. 3 as tending to produce a tilting displacement of the vehicle body about its longitudinal axis. Positive roll forces therefore tend to produce downward displacements of the left hand side of the vehicle body and upward displacements of the right hand side.

Figure 4:
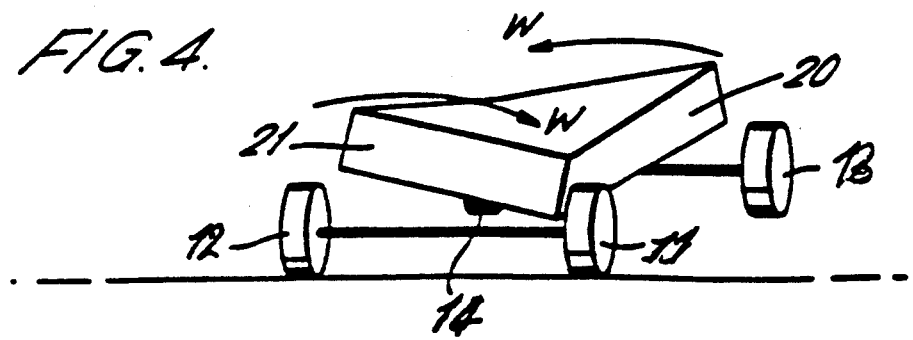
FIG. 4 is a schematic representation of the effects of warp forces on the body of a motor vehicle not having an active suspension system.

FIG. 4 shows the effect of a positive warp force on the vehicle body. A warp force tends to displace one pair of diagonally opposite corners of the vehicle body downwardly and the other pair upwardly in the case of a generally rectangular body. According to the sign convention used herein, the front left and rear right corners of a vehicle active suspension system are downwardly displaced for positive values of warp force.

It is helpful when considering the forces experienced by a vehicle body which may be resolved into modal forces to divide them into three categories.

The static loads of the vehicle represent the reaction forces required to support the mass of the vehicle and its cargo/passenger load when the vehicle is stationary.

The steady state loads on a vehicle in motion are those occasioned by the values of the variables of vehicle motion, such as steering angle, vehicle speed, vehicle acceleration/deceleration and the like.

Dynamic loads imposed on the vehicle result from movement of the wheel and hub assemblies, the unsprung masses, when encountering bumps, dips and the like in a road. It is necessary when designing an active suspension system to compensate for the steady state loads, so that the suspension system does not deflect under the steady state loads, but instead responds solely to the road inputs. There is an exception to this, in that it may be desired that the suspension system reacts to forces applied to the vehicle by reason of its cornering almost so as to modify the attitude of the vehicle throughout cornering to improve road holding.

The dynamic loads on a vehicle are those occasioned by "road inputs", which the driver of the vehicle cannot predict. Such dynamic loads occur, for example, when a gust of cross-wind influences the vehicle, and when a wheel of the vehicle encounters a bump in the road surface.

Figure 5:
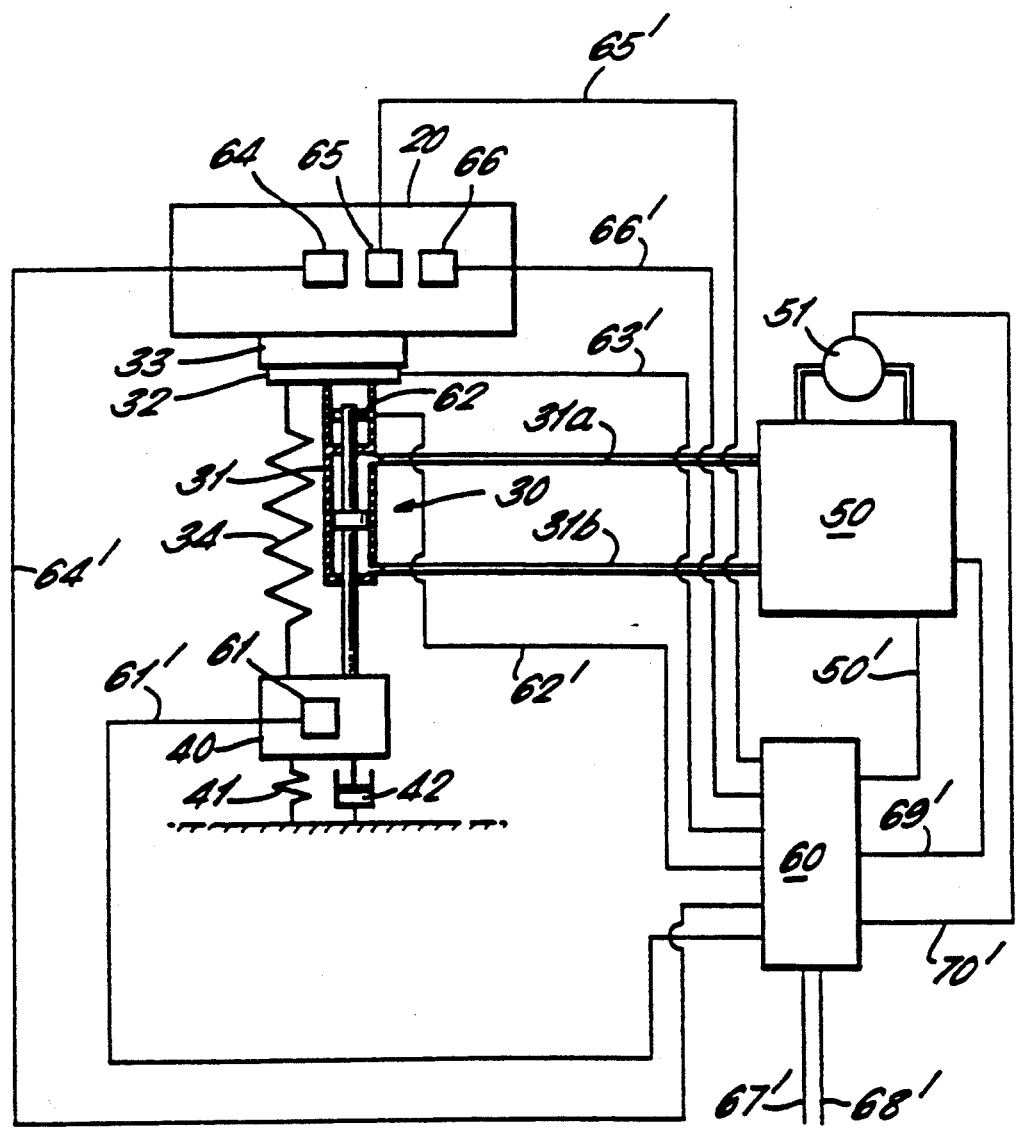
FIG. 5 is a schematic representation of a portion of a control system according to the invention.

Referring to FIG. 5, there is shown a schematic representation of a control system according to the invention.

The arrangement of FIG. 5 represents one quarter of the control system of a four-wheeled vehicle, one unsprung mass in the form of a wheel/hub assembly being shown, the system for the remaining three unsprung masses being similar.

In FIG. 5, the sprung mass of the vehicle in the form of the vehicle body 20 is shown supported on a number of suspension components indicated generally by the reference sign 30, which are in turn supported on a wheel and tyre modelled as an unsprung mass 40 in the form of the wheel/hub assembly supported on a spring 41 and damper 42 representing the tyre characteristics.

The suspension components 30 comprise means for applying forces to control the attitude of the vehicle, in the form of an hydraulic actuator 31 shown vertically aligned and secured at its upper end to a load cell 32 which is separated from the vehicle body 20 by an isolator 33, which may be, for example, a rubber block. The actuator 31 need not necessarily be vertically aligned, depending on the space available for suspension components and the suspension layout adopted. The load cell 32 is capable of measuring at least a portion of the loads acting between the wheel/hub assembly and the vehicle body and producing a signal proportional to the loads.

A spring 34 is shown connected in parallel with the hydraulic actuator 31.

The spring 34 does not control the attitude of the vehicle in the way that it would in a vehicle having a conventional suspension system. Road spring 34 serves merely to reduce the power consumption of the control system of the invention by bearing a significant proportion of the static load of the vehicle body 20.

Thus, the operation of actuator 31 may take place over a wide range of displacements actually to effect control of the vehicle without requiring an excessive power consumption as would normally be required if the actuator were to support the static load of the vehicle body 20 in addition to controlling the steady state and dynamic loadings resulting from dynamic and steady state forces acting on the vehicle.

Since the power consumption of actuator 31 is reduced, by the use of spring 34, its piston area may be designed to be relatively small, thereby producing a compact device. Further, spring 34 serves as a fail-safe device in that it supports the static load of the vehicle body 20 in the event of total failure of the control system of the invention.

The input and output ports of the hydraulic actuator 31 are connected via hydraulic pipework 31a and 31b to a hydraulic control circuit 50 including a suitable supply pump 51. The hydraulic circuit 50 operates, via electrical connection 50', under the command of a microprocessor 60 which produces a demanded output of the actuator 31 in response to a number of measured inputs.

The inputs to the microprocessor 60 are as follows:

Line 61' carries the output of accelerometer 61 measuring the vertical acceleration of the unsprung mass 40;

Line 62' carries the output of linear variable inductive transformer (LVIT) 62 measuring the displacement of actuator 31;

Line 63' carries the output of load cell 32 measuring the force transmitted to sprung mass 20 via the suspension components 30;

Line 64' carries the output of accelerometer 64 located near the sprung mass centre of gravity and measuring the sprung mass longitudinal acceleration;

Line 65' carries the output of accelerometer 65 located near the sprung mass centre of gravity and measuring the sprung mass lateral acceleration;

Line 66' carries the output of gyrometer 66 located near the sprung mass centre of gravity and measuring the sprung mass yaw rate (ie rotational velocity);

Line 67' carries a vehicle speed signal from measuring means (not shown);

Line 68' carries a steering rack displacement signal from measuring means (not shown);

Line 69' carries a hydraulic system pressure signal from measuring means (not shown); and Line 70' carries swash plate angle signal from measuring means (not shown) located in the pump 51.

The load cell 32 measures the net load acting between the upper end of actuator 31 and the vehicle body 20. This load is, consequently, representative of the road input to the vehicle in that a force due to a wheel of the vehicle encountering a bump or dip in the road is at least partly transmitted to the vehicle body via load cell 32. However, the load measured by load cell 32 generally includes spurious force measurements which it is not required to process, and further does not include any allowance for elements of the force due to the wheel encountering a bump or dip which are transmitted to the body via parallel load paths not including the load cell 32 itself.

FIG. 5 shows a load cell 32 which measures forces transmitted to the body of the vehicle by both the actuator 31 and the spring 34. However, the applicant envisages a system wherein the load cell 32 measures only load transmitted to the body by the actuator 32 and not the load transmitted by the spring 34. The load transmitted to the body by the spring can be calculated from the displacement of the actuator 31, measured by the LVIT 62.

The microprocessor 60 of FIG. 5 is capable of resolving the forces measured at each of a number of load cells 32 into a plurality of modal forces corresponding to the modes of vehicle displacement described above acting on the vehicle body. Clearly, in the case of a four-wheeled vehicle, the number of measured forces at the load cells 32 associated respectively with each wheel/hub assembly is four.

It has been found during the development of the invention that if the modal forces calculated from the measured force values above are used to control the attitude of the vehicle, accurate control is not wihtin acceptable limits. Therefore, the dynamic force on the vehicle body cause by the acceleration of wheel/hub assembly must also be taken into account, and this is done by multiplying the measured value of the wheel/hub assembly 40 by a mass term.

The heave modal force, for example, is therefore isolated in the following expression:

$$Hf = \frac{8}{(65536)^2} [IVrfH*\{65536(F1 + F2) + MMF*(DDXu1 + \quad (1)$$

$$DDXu2) + IVrrH*\{65536(F3 + F4) + MMr*(DDXu3 + DDXu4)\}]$$

In which:
Hf = Generalised heave force
IVrfH = Front inverted heave load velocity ratio
IVrrH = Rear inverted heave load velocity ratio
F1 ... F4 = Measured heave forces
MMF = Unsprung mass acceleration gain (front)
MMr = Unsprung mass acceleration gain (rear)
DDXu1 ... DDXu4 = Measured unsprung mass accelerations.

The method of isolating a modal force varies depending on whether the measured corner forces combine positively or negatively to form each modal force respectively.

In the case of the heave modal force, as illustrated in FIG. 1, all the steady state forces and dynamic forces combine positively, so addition terms are used throughout expression (1).

The road input contribution to the heave force is obtained firstly, by adding the corresponding pairs of steady state forces $(F_1+F_2)$ and $(F_{3+}F_4)$ measured at the respective load cell of each point of support of the vehicle body. These sums are then each scaled by a common factor, 65536.

The dynamic forces are similarly calculated in pairs (DDxu1+DDxu2) and (DDxu3+DDxu4) representing the front and rear wheel/hub accelerations. The front sum is then multiplied by a front mass gain term (MMF) to obtain a force value, and the rear sum by a rear gain term (MMr) to obtain a rear force value.

The front forces are then summed and multiplied by a proportioning factor (IVrfH) corresponding to the proportion of the heave force which is attributable to the front of the vehicle. The rear forces are similarly summed and multiplied by a proportioning factor (IVrrH) corresponding to the proportion of the heave force attributable to the rear of the vehicle.

Clearly, since the isolation of the heave force is effected by the microprossor 60, and the factors MMF, MMr, IVrFH and IVrrH are not measured values, their values may be changed using a suitable input means (not shown) to the microprocessor 60. Changing the four parameters listed hereinabove therefore alters the calculated value of the heave force, and hence may be used to alter the control system's response to a particular loading condition.

The remaining three modal forces, of pitch, roll and warp, are isolated by the microprocessor 60 using the following expressions:

For pitch:

$$Pf = \frac{8}{(65536)^2} [IVrfP*\{65536(F1 + F2) + MMF*(DDxu1 + \quad (2)$$

$$DDxu2) - IVrrP*\{65536(F3 + F4) + MMr*(DDxu3 + DDxu4)\}]$$

For Roll:

$$Rf = \frac{8}{(65536)^2} [IVrfR*\{65536(F1 - F2) + MMF*(DDxu1 - \quad (3)$$

$$DDxu2) + IVrrR*\{65536(F3 - F4) + MMr*(DDxu3 - DDxu4)\}]$$

For Warp $$Wf = \frac{8}{(65536)^2} [IVrfW*\{65536(F1 - F2) + MMF*(DDxu1 - \quad (4)$$

$$DDxu2) - IVrrW*\{65536(F3 - F4) + MMr*(DDxu3 - DDxu4)\}]$$

In which:
Pf=Generalised pitch force
IVrFP=Inverted pitch load velocity ratio (front)
IVrrP=Inverted pitch load velocity ratio (rear)
Rf=Generalised roll force
IVrFR=Inverted roll load velocity ratio (front)
IVrRR=Inverted roll load velocity ratio (rear)
Wf=Generalised warp force
IVrFW=Inverted warp load velocity ratio (front)
IVrrW=Inverted warp load velocity ratio (rear)

The modal forces are therefore scaled combinations of the measured values, the combinations including either positive or negative values of the measured inputs depending on whether, according to the sign convention adopted in FIGS. 1 to 4, the forces combine positively or negatively as the respective modal forces. Clearly, the control system of the invention is highly versatile since adjustment of the various scaling factors introduced in equations 1 to 4, by, for example, key pad input to the microprocessor 60, causes the vehicle to respond to each modal force in a predetermined manner. In this way the suspension may be made, for example, stiff in roll yet soft in heave.

The generalised modal force values given by equations 1 to 4 do not take account of unmeasured loads instigated by the vehicle, such as loads transmitted to the vehicle body via load paths not including the various transducers. Such loads do not give pure modal displacements, and therefore in taking account of them their effects in cross coupling between the modal displacements must also be allowed for.

The type of linkages used commonly to connect the wheel and hub assemblies to the body of a vehicle are not perfect in construction and therefore part of the load reacted by the unsprung masses is carried by linkages directly to the vehicle body rather than through the springs and actuators. It is necessary to compensate for these unmeasured loads in the operation of the active suspension system.

Further, there is envisaged an active suspension system in which load cells measure only loads on the actuators, without measuring the loads applied to the vehicle by the springs. In such a situation, obviously, the forces exerted by the springs are unmeasured loads and hence must be allowed for.

The microprocessor 60 is thus able to produce modified values of the modal forces, as follows:

$$Hf = \frac{1}{65535} [Hf*65536 + 2*KHHs*Hx + 2*KHPs*Px] \quad (5)$$

$$Pf = \frac{1}{65535} [Pf*65536 + 2*KPPs*Px + 2*KPHs*Hx] \quad (6)$$

$$Rf = \frac{1}{65535} [Rf*65536 + 2*KRRs*Rx + 2*KRWs*Wx] \quad (7)$$

$$Wf = \frac{1}{65535} [Wf*65536 + 2*WCnx(+/-)*Snx + WcDr*Dr + \quad (8)$$

$$2*(KWWs*Wx + KWRs*Rx)]$$

In which:
Hf'=modified generalised heave force
KHHs=change in heave spring load per unit displacement in the heave direction
KHPs=change in heave spring load per unit displacement in the pitch direction
Hx=heave displacement value
Px=pitch displacement value
Pf'=modified generalised pitch force
KPPs=change in load per unit displacement in the pitch direction
KPHs=change in pitch load per unit displacement in the heave direction
Rf'=modified generalised roll force
KRRs=change in roll load per unit displacement in the roll direction
KRWs=change in roll load per unit displacement in the warp direction
Rx=roll displacement value
Wx=warp displacement value
Wf'=modified generalised warp force
WCnx(+/−)=warp acceleration compensation gain
Mxn=scaled longitudinal acceleration
WCDr=yaw acceleration compensation gain in warp
Dr=estimated yaw acceleration
KWWs=change in warp load per unit displacement in the warp direction
KWRs=change in warp load per unit displacement in the roll direction The modal displacement values (Hx, Px, Rx and Wx) are calculated by the microprocessor 60 from the measured actuator displacement values (X1 ... X4). The yaw acceleration estimated value (Dr) is calculated from the yaw rate measurement referred to hereinabove.

The following equations are used by the microprocessor 60 to isolate the modal displacement values:

$$Hx = \frac{4}{65536} *[Vrf(X1 + X2) + Vrr(X3 + X4)] \quad (9)$$

$$Px = \frac{4}{65536} *[Vrf(X1 + X2) - Vrr(X3 + X4)] \quad (10)$$

$$Rx + \frac{4}{65536} *[Vrf(X1 + X2) + Vrr(X3 - X4)] \quad (11)$$

$$Wx + \frac{4}{65536} *[Vrf(X1 - X2) - Vrr(X3 - X4)] \quad (12)$$

In which:
Vrf=front geometric velocity ratio multiplied by the gain of the actuator LVIT
Vrr=rear geometric velocity ratio multiplied by the gain of the LVIT
X1 ... X4=Measured actuator displacements.

The terms KHHs, KPPs, KRRs and KWWs in equations (5) to (8) represent the pure modal forces resulting from the unmeasured vehicle loads and they are input to the microprocessor as parameters. The values of the parameters may be obtained by testing the vehicle with the control system of the invention switched off.

The values of parameters will depend on the geometry of the suspension linkages used. The parameters may be evaluated by executing a series of manoeuvres on a smooth surface with a vehicle employing the active suspension system. Alternatively, an algorithm can be devised to identify parameters or parameters can be calculated from the precise geometric arrangement of the suspension linkages.

When the loads applied to the body by the springs are not measured directly they become unmeasured loads and must be estimated. The values of the co-efficients employed in the estimation of the forces transmitted by the springs can be evaluated by demanding a smoothly changing vehicle height relative to the ground for the entire stroke of each actuator, the co-efficients being chosen so that the corrected modal force vector shows no change with actuator position. It is important that heave displacement is solely changed during this procedure and that the changes take place smoothly and slowly so that no vertical inertia forces are generated.

The terms KHPs, KPHs, KRWs and KWRs represent the cross-coupling effects between the modal forces caused by the unmeasured vehicle loads. From these terms, which are also parameters which are input to the microprocessor 60, it is clear, for example, that the modified roll force Rf' includes a pure roll mode force (2*KRRs*Rx) caused by the unmeasured vehicle spring loads and force (2*KRWs*Wx) which is cross coupled from the warp mode, ie it manifests itself in the roll mode as a result of warp mode displacement due to the unmeasured vehicle spring loads. The cross-coupling effect of one particular modal displacement on the froce associated with another modal direction have been determined by experiment. Thus, for example, experience has shown that a displacement of the vehicle body in the roll direction not only changes the value of the roll load, but also, due to the cross-coupling effect referred to herein, changes the value of the warp load. Similar considerations apply to the other displacement modes, the result being equations (5) to (8) above.

The terms WXCnx and WCDr indicate that the control system of the invention takes account of warp modal forces occasioned by the longitudinal acceleration value (Snx) measured by accelerometer 65 and by the yaw acceleration calculated from the yaw rate measured by gyroscope 66.

The modified modal forces Hf', Pf', Fr' and Wf' may be further processed in microprocessor 60 to produce a demanded output of the actuator 31, which output is implemented by the hydraulic circuit 50, in order to maintain a constant steady state load on the vehicle sprung mass 20 and transmit significantly reduced dynamic loads thereto. It is theoretically possible using the control system of the invention to transmit no dynamic load to the vehicle body, but this has the effect of introducing zero damping into the suspension system. This is clearly undesirable from the point of view of vehicle ride, and the control system is therefore adjusted to confer an adequate damping ratio on the suspension system by transmitting limited dynamic loads to the vehicle body.

The signal from hub accelerometer 61 may additionally be used to alter the apparent mass of the wheel/hub assembly. For example, while in the apparatus of FIG. 5 it is always advantageous to determine the contribution to the load measured by load cell 32 due to the accelerations of the wheel/hub assembly, it is also possible to process the signal from accelerometer 61 in an additional feed forward loop the output of which is added to the demanded output of the actuator 31. The output of the feed forward loop may be modified to include any proportion of the accelerometer signal, thereby altering the mass of the wheel/hub assembly apparent at the point where the output of the feed forward loop is added to the demanded output of the actuator 31.

The advantage of processing the signal from accelerometer 61 in this additional manner is that the combined signal output to actuator 31 may be arranged to include not only a proportion of the force measured as a result of the actual acceleration of the wheel/hub assembly, but also an additional signal representative of some factor of the mass thereof. This latter signal may, by appropriate programming of the microprocessor 60, be adjusted independently of the former signal, so that, for example, forces due to one apparent wheel/hub assembly mass and a natural frequency of another wheel/hub mass be calculated within microprocessor 60 from a single accelerometer signal measuring the vertical acceleration of a wheel/hub assembly of constant mass.

Such an arrangement is particularly advantageous since it is generally necessary to take account of the full mass of the wheel/hub assembly from the point of view of loads transmitted to the vehicle body, while it may be necessary to change the apparent material frequency of the wheel/hub assembly to avoid resonance in the response of system under certain conditions. If the natural frequency of the wheel/hub assembly can, as far as an observer of the system from the actuator end is concerned, be adjusted to be outside the range of output signal frequencies, the wheel/hub assembly cannot be induced to resonate by an output signal of the system.

When a motor vehicle is in motion, clearly both the steady state and dynamic load values vary rapidly, so the microprocessor 60 is capable of sampling the signals from the various transducers sufficiently rapidly in sequence to enable the actuator adjustment to be effective in controlling or correcting the attitude of the vehicle.

The control system of the invention is highly versatile, since any of the parameters described herein as inputs to the microprocessor 60 may be altered. Thus the entire road behaviour of the vehicle may be tailored to suit specific requirements and may be adjusted to create desirable ride and handling conditions of the vehicle at all times of operation of the vehicle.

We claim:

1. A land vehicle suspension system of the kind comprising a suspension linkage connected between a sprung mass of the vehicle and at least one unsprung mass of the vehicle; actuator means for controlling the position of the suspension linkage; means for measuring the loads transmitted to the sprung mass by the actuator means; means for producing signals proportional to the values of said measured loads; means for modifying said signals to compensate for unmeasured loads between the sprung mass and the at least one unsprung mass acting via load paths in the suspension linkage which do not include the actuator means; and means for controlling the actuator means to apply forces to control the attitude of the vehicle in dependence on said modified signals.

2. A control system according to claim 1, wherein each unsprung mass of the vehicle is a wheel, hub and tyre assembly, and the sprung mass of the vehicle is substantially the remainder of the mass of the vehicle.

3. A control system according to claim 1, wherein said means for modifying said signals modifies said signals to compensate for portions of said measured loads which do not result from movements of said unsprung mass.

4. A control system according to claim 1, wherein the means for modifying said signals includes means for resolving said signals as representative of a plurality of modal forces acting on the sprung mass of the vehicle.

5. A control system according to claim 4, wherein the modal forces are heave, pitch, roll and warp modal forces.

6. A control system according to claim 4, wherein the modal values of the measured forces are modified by multiplying them by factors representing the effects of unmeasured loads of the same modes thereupon.

7. A control system according to claim 4, wherein the modal values of the measured forces are modified by multiplying them by factors representing the effects of unmeasured loads of different modes thereupon.

8. A control system according to claim 1, including means for measuring the vertical acceleration of each unsprung mass of the vehicle; means for producing signals proportional to said measured accelerations; means for modifying said acceleration proportional signals to increase or decrease the extent to which each such signal is dependent on the magnitude of its corresponding unsprung mass; and means to apply force to control the attitude of the vehicle in dependence on said modified acceleration proportional signals.

9. A control system according to claim 8, wherein said means for modifying said acceleration proportion signals is capable of modifying the signals independently of other signals in the control system.

* * * * *

UNITED STATES PATENT AND TRADEMARK OFFICE
CERTIFICATE OF CORRECTION

PATENT NO.  : 5,217,246
DATED       : June 8, 1993
INVENTOR(S) : DAVID A. WILLIAMS, PETER G. WRIGHT, JOHN P. DAVIS It is certified that error appears in the above-identified patent and that said Letters Patent is hereby corrected as shown below:

Col. 12, line 6, delete "force", insert --forces--

Signed and Sealed this

Eighteenth Day of January, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,217,246
DATED : June 8, 1993
INVENTOR(S) : DAVID A. WILLIAMS, PETER G. WRIGHT, JOHN P. DAVIS It is certified that error appears in the above-indentified patent and that said Letters Patent is hereby corrected as shown below:

Column 10, line 41, after "A" insert --control system for controlling a--"

Column 10, line 44, delete the semicolon ";", insert --and--;

Column 10, line 45, delete the semicolon ";", insert --comprising--;

Column 10, line 46, delete "the" (first occurrence only)

Signed and Sealed this

Sixth Day of September, 1994

Attest:

BRUCE LEHMAN

Attesting Officer  Commissioner of Patents and Trademarks